(12) United States Patent
Maeng et al.

(10) Patent No.: US 12,734,475 B2
(45) Date of Patent: Sep. 15, 2026

(54) MEMBRANE PERMEATE RECYCLE WITH PRESSURIZED ANAEROBIC DIGESTERS

(71) Applicant: L'Air Liquide, Société Anonyme pour l'Etude et l'Exploitation des Procédés Georges Claude, Paris (FR)

(72) Inventors: Min Ho Maeng, Newark, DE (US); Sudhir Kulkarni, Wilmington, DE (US); Shu Fang, Newark, DE (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 503 days.

(21) Appl. No.: 17/961,002

(22) Filed: Oct. 6, 2022

(65) Prior Publication Data

US 2024/0115988 A1 Apr. 11, 2024

(51) Int. Cl.
*B01D 53/22* (2006.01)

(52) U.S. Cl.
CPC ......... *B01D 53/228* (2013.01); *B01D 53/226* (2013.01); *B01D 2257/504* (2013.01); *B01D 2257/7025* (2013.01); *B01D 2258/05* (2013.01); *B01D 2323/21839* (2022.08)

(58) Field of Classification Search
None
See application file for complete search history.

(56) References Cited

U.S. PATENT DOCUMENTS 7,025,803 B2 4/2006 Waschek et al.
8,409,439 B1 4/2013 Tovani et al.
9,988,326 B2 * 6/2018 Paget .................. B01D 53/226
10,106,756 B2 * 10/2018 Paget ........................ C10L 3/08
10,179,883 B2 1/2019 Mitariten
10,589,215 B2 3/2020 Ding et al.
11,731,076 B1 * 8/2023 O'Brien .................. C07C 7/005 585/818
11,980,846 B1 * 5/2024 Bikson ................. B01D 53/227

(Continued)

FOREIGN PATENT DOCUMENTS

CN 104003832 8/2014
CN 104651412 5/2015

(Continued)

OTHER PUBLICATIONS

Alibardi, L. et al., Performance and stability of sewage sludge digestion under $CO_2$ enrichment: a pilot study, Bioresource Technology 245 (2017) 581-589.

(Continued)

*Primary Examiner* — Dung H Bui
(74) *Attorney, Agent, or Firm* — Yan Jiang; Christopher J. Cronin

(57) ABSTRACT

A system for upgrading biogas through a membrane separation process comprises an anaerobic digester, operated under an operation pressure higher than atmosphere pressure, preferably greater than 4 baba, generating the biogas, a first membrane stage and a second membrane stage, separating the biogas into a residue stream, enriched in $CH_4$, and a permeate stream, enriched in $CO_2$, a compressor compressing the permeate stream to a pressure slightly greater than the operation pressure, and recycling the permeate stream back to the bottom volume of the anaerobic digester.

15 Claims, 3 Drawing Sheets

(56) References Cited

U.S. PATENT DOCUMENTS

| | | | | |
|---|---|---|---|---|
| 12,139,681 | B1 * | 11/2024 | Bikson | C10L 3/106 |
| 12,139,862 | B2 * | 11/2024 | Lee | B01D 46/10 |
| 12,264,288 | B1 * | 4/2025 | Bikson | B01D 53/265 |
| 12,281,273 | B1 * | 4/2025 | Bikson | B01D 53/229 |
| 12,337,276 | B2 * | 6/2025 | Pedersen | C10L 3/104 |
| 2002/0079266 | A1 * | 6/2002 | Ainsworth | C12M 21/04 210/603 |
| 2012/0118011 | A1 * | 5/2012 | Terrien | B01D 53/226 62/619 |
| 2016/0184769 | A1 | 6/2016 | Kulkarni | |
| 2016/0288047 | A1 * | 10/2016 | Fukuda | B01D 53/22 |
| 2016/0346727 | A1 * | 12/2016 | Yeo | B01D 53/226 |
| 2018/0223205 | A1 * | 8/2018 | Mitariten | C10L 3/104 |
| 2018/0250627 | A1 * | 9/2018 | Zick | B01D 53/226 |
| 2018/0251694 | A1 | 9/2018 | Foody et al. | |
| 2019/0024617 | A1 | 1/2019 | Fukui et al. | |
| 2019/0030482 | A1 * | 1/2019 | Ding | B01D 53/228 |
| 2019/0224617 | A1 * | 7/2019 | Mitariten | B01D 71/76 |
| 2020/0177787 | A1 | 6/2020 | Satou et al. | |
| 2020/0188843 | A1 | 6/2020 | Barraud et al. | |
| 2020/0254383 | A1 * | 8/2020 | Roodbeen | B01D 53/226 |
| 2020/0316516 | A1 * | 10/2020 | Wu | C10L 3/104 |
| 2020/0360854 | A1 * | 11/2020 | Vaidya | B01D 71/32 |
| 2021/0299605 | A1 * | 9/2021 | Henry | C07C 7/144 |
| 2021/0339189 | A1 | 11/2021 | Winkler | |
| 2022/0134274 | A1 * | 5/2022 | Pedersen | B01D 53/30 585/818 |
| 2022/0203293 | A1 * | 6/2022 | Myrick | B01D 53/226 |
| 2022/0203294 | A1 * | 6/2022 | Myrick | B01D 53/228 |
| 2022/0203295 | A1 * | 6/2022 | Myrick | B01D 53/225 |
| 2023/0271130 | A1 * | 8/2023 | Priske | B01D 53/227 96/7 |
| 2024/0115988 | A1 * | 4/2024 | Maeng | B01D 53/228 |
| 2024/0117285 | A1 * | 4/2024 | Kulkarni | B01D 53/227 |
| 2024/0409409 | A1 * | 12/2024 | Terrien | C01B 23/0042 |
| 2025/0035376 | A1 * | 1/2025 | Valentin | F25J 3/0252 |
| 2025/0136884 | A1 * | 5/2025 | O'Brien | B01D 53/226 |

FOREIGN PATENT DOCUMENTS

| | | | | |
|---|---|---|---|---|
| CN | 108624370 | | 10/2018 | |
| CN | 113573796 | * | 10/2021 | C10L 3/104 |
| CN | 106039942 | * | 7/2022 | B01D 53/22 |
| EP | 2 614 890 | | 7/2013 | |
| EP | 3 964 558 | | 3/2022 | |
| FR | 3048366 | | 9/2017 | |
| KR | 2012 0119755 | | 10/2012 | |
| KR | 101327338 | | 11/2013 | |
| KR | 101509133 | | 4/2015 | |
| KR | 2017 0123726 | | 11/2017 | |
| KR | 2019 0009966 | | 1/2019 | |
| WO | WO 2015 155427 | | 10/2015 | |
| WO | WO 2022 012944 | | 1/2022 | |
| WO | WO 2023 212754 | | 11/2023 | |

OTHER PUBLICATIONS

Al-Mashhadani, M.K.H et al., Carbon dioxide rich microbubble acceleration of biogas production in anaerobic digestion, Chemical Engineering Science 156 (2016) 24-35.

Angelidaki, I. et al., Biogas upgrading and utilization: current status and perspectives, Biotechnology Advances 36 (2018) 452-466.

Bajon Fernandez, Y. et al., Carbon capture and biogas enhancement by carbon dioxide enrichment of anaerobic digesters treating sewage sludge or food waste, Bioresource Technology 159 (2014) 1-7.

Bajon Fernandez, Y. et al., Enhancing the anaerobic digestion process through carbon dioxide enrichment: initial insights into mechanisms of utilization, Environmental Technology 2019, vol. 40, No. 13, 17844-1755

Bakonyi, P. et al., A novel gas separation integrated membrane bioreactor to evaluate the impact of self-generated biogas recycling on continuous hydrogen fermentation, Applied Energy 190 (2017) 813-823.

Bergamo, U. et al., Analysis of anaerobic digester mixing: comparison of long shafted paddle mixing vs gas mixing, Water Science & Technology, 81.7, 2020, 1406-1419.

Esposito, E. et al., Simultaneous production of biomethane and food grade $CO_2$ from biogas: an industrial case study, Energy Environ. Sci. 2019, 12, 281-289.

Koch, K. et al., Methane from $CO_2$: influence of different $CO_2$ concentrations in the flush gas on the methane production in BMP tests, Waste Management 49 (2016) 36-39.

Kovalev, A.A. et al., Feasibility study of anaerobic codigestion of municipal organic waste in moderately pressurized digesters: a case for the Russian Federation, Applied Sciences 2022, 12, 2933, 1-14.

Lee, D.- Y. et al., Effect of organic loading rate on continuous hydrogen production from food waste in submerged anaerobic membrane bioreactor, Int'l Journal of Hydrogen Energy 39 (2014) 16863-16871.

Lee, J.C. et al., Biological conversion of $CO_2$ to $CH_4$ using hydrogenotrophic methanogen in a fixed bed reactor, J. Chem Technol Biotechnol 2012; 87: 844-847.

Lemmer, A. et al., Integration of a water scrubbing technique and two-stage pressurized anaerobic digestion in one process, Energies (2015) 8 2048-2065.

Lindeboom, R.E.F., Autogenarative high pressure digestion: biogas production and upgrading in a single step, Water Science & Technology (2011) 64(3) 647-653.

Muntau, M. et al., Effects of $CO_2$ enrichment on the anaerobic digestion of sewage sludge in continuously operated fermenters, Bioresource Technology 332 (2021) 125147, 1-10.

Ramirez-Morales, J.E. et al., Evaluation of two gas membrane modules for fermentative hydrogen separation, Int'l Journal of Hydrogen Energy 38 (2013) 14042-14052.

Salomoni, C. et al., Enhanced methane production in a two-phase anaerobic digestion plant, after $CO_2$ capture and addition to organic wastes, Bioresource Technology 102 (2011) 6433-6448.

Siciliano, A. et al., Performance evaluation of pressurized anaerobic digestion (PDA) of raw compost leachate, Fermentation 2022, 8, 15, 1-17.

Singh, B. et al., State of the art on mixing in an anaerobic digester: a review, Renewable Energy 141 (2019) 922-936.

Statistical Report of the European Biogas Association 2021, Brussels, Belgium, Nov. 2021, 140 pages.

* cited by examiner

MEMBRANE PERMEATE RECYCLE WITH PRESSURIZED ANAEROBIC DIGESTERS

TECHNICAL FIELD

The present invention relates to a membrane separation process for upgrading biogas generated through an anaerobic digestion (AD) process operating at a pressure greater than 4 bara with membrane permeate stream recycled to the anaerobic digester and membrane residue stream enriched in fuel value.

BACKGROUND

Various upgrading processes based on adsorption, water scrubbing or membranes are available for the conversion of raw biogas produced by landfills, anaerobic digesters and water treatment to renewable natural gas (RNG). Current state of art is a (one or more) stage membrane process which removes acid gases such as $CO_2$ from the RNG. Feed gas is typically filtered, treated for removal of contaminants such as $H_2S$, and then compressed, typically to 5 to 15 bar. The compressed cleaned gas is then fed to one or more membrane stages where $CO_2$ is preferentially transported into the lower pressure permeate (typically 1-2 bar). 95% or more $CH_4$ enriched in the residue is typically polished further as needed and then compressed by a booster for pipeline entry.

US 2019/0030482 discloses a method for producing biomethane that removes impurities from a compressed anaerobic digester biogas with staged membrane modules of at least two different types, to produce a biomethane having at least 94% $CH_4$, less than 3% of $CO_2$, and below 4 ppm of $H_2S$.

US 2018/0251694 discloses a method for providing upgraded biogas through a biogas upgrading system that may be based on absorption, adsorption, membrane permeation, and/or cryogenics, in which a stream of upgraded biogas and a tail gas stream are provided. The tail gas stream, which may be $CO_2$-rich, is enriched with natural gas so that it is combustible in medium-BTU equipment. The upgraded biogas is used for transportation use and/or the generation of fuel credits. Accordingly, both the tail gas and the upgraded biogas are used effectively and at lower cost.

U.S. Pat. No. 10,179,883 discloses a method of removing $H_2S$ from a biogas containing $H_2S$ and $CO_2$ by using Pressure-Temperature Swing Adsorption (PTSA) and two stages of gas separation membranes. The first stage permeate may optionally be used a regeneration gas stream. The second stage permeate may optionally be used a cool down gas stream. The PTSA unit includes two or more adsorbent beds each selective for water, Volatile organic compounds (VOCs), and $H_2S$ over $CO_2$ and for $H_2S$ over methane.

U.S. Pat. No. 9,988,326 discloses a four-stage membrane separation unit purification process, especially for pre-purified biogas, in which a retentate from the first stage is fed as feed gas to a second stage, a permeate from the first stage is fed as feed gas to a third stage, and retentate from the third stage is fed as feed gas to a fourth stage.

U.S. Pat. No. 8,409,439 discloses a pressurized digestion vessel to reduce waste and produce enough electricity for internal use in an efficient way.

Lindeboom et al. (Autogenerative high pressure digestion: anaerobic digestion and biogas upgrading in a single step reactor system (2011), Water Science & Technology, 64 (3), 647-653) purify biomethane by operating an anaerobic digester at 3-90 bar. Headspace $CH_4$ content reached to 90-95% and most of $CO_2$ was dissolved in sludge phase. No membrane separation to purify biogas is disclosed and no $CO_2$ recirculation scheme is disclosed.

Lemmer et al., (Integration of a Water Scrubbing Technique and Two-Stage Pressurized Anaerobic Digestion in One Process (2015), Energies, 8 (3), 2048-2065) disclose a two-stage anaerobic digester with water scrubbing system operated at 9 bar. The anaerobic digester content recirculates via the water scrubbing system. The dissolved $CO_2$ in the recirculation stream was released due to the pressure drop and the pH value of the anaerobic digester increased from 6.5 to 6.7. The $CH_4$ content increased from 75% to 87%.

Kovalev et al., (Feasibility Study of Anaerobic Codigestion of Municipal Organic Waste in Moderately Pressurized Anaerobic digesters: A Case for the Russian Federation (2022), Applied Sciences, 12 (6), 2933) conduct a feasibility study of anaerobic co-anaerobic digester system at moderate excess pressures (1-2 bar). The $CH_4$ content was 65% for all pressure conditions. The maximum methane yield was 202.44 mL/g volatile solid (VS) at 1.5 bar.

Siciliano et al., (Performance Evaluation of Pressurized Anaerobic Digestion (PDA) of Raw Compost Leachate (2022), Fermentation, 8 (1), 15) investigates a pressurized anaerobic digester to improve the biogas quality from raw compost leachate. The $CH_4$ content increased to 75% at 4 bar, but the organic removal efficiency and the biogas production decreased with increasing anaerobic digester pressure.

Existing methods for upgrading $CH_4$ content in raw biogas from pressurized anaerobic digesters have not utilized any membrane separation technologies to increase the $CH_4$ content and recirculate the membrane permeate gas back to the anaerobic digester.

SUMMARY

There is disclosed a system for upgrading biogas through a membrane separation process comprising:

- an anaerobic digester, operated under an operation pressure higher than atmosphere pressure, configured to generate the biogas from a feedstock containing an organic content;
- a first membrane stage, configured to separate the biogas into a first residue stream, enriched in $CH_4$, withdrawn from the residue side of the first membrane stage and forwarded to the second membrane stage as a feed gas therein, and a first permeate stream, enriched in $CO_2$, withdrawn from the permeate side of the first membrane stage, and vented out;
- a second membrane stage, connected to the first membrane stage in series, configured to separate the residue stream from the first membrane into a second residue stream, enriched in $CH_4$, withdrawn from the residue side of the second membrane stage and forwarded to a point of use, and a second permeate stream, enriched in $CO_2$, withdrawn from the permeate side of the second membrane stage and sent to a compressor; and
- the compressor, configured to compress the second permeate stream from the second membrane stage to a pressure slightly greater than the operation pressure,
- wherein the compressed second permeate stream is recycled back to the bottom volume of digestate sludge phase in the anaerobic digester.

In some embodiments, the operation pressure is higher than 4 bara.

In some embodiments, the system further comprises a third membrane stage, configured to separate the first permeate stream from the first membrane stage into a third residue stream containing $CO_2$ and $CH_4$, withdrawn from the residue side of the third membrane stage and sent to the compressor, and a third permeate stream, enriched in $CO_2$, withdrawn from the permeate side of the third membrane stage, and vented out;

wherein the residue stream from the third membrane stage in combination with the permeate stream from the second membrane stage is compressed and recycled back to the bottom volume of the digestate sludge phase in the anaerobic digester.

In some embodiments, the amount of $CO_2$ concentration in the residue stream from the third membrane stage is close to the amount of $CO_2$ concentration in the permeate stream from the second membrane stage.

In some embodiments, the first membrane stage, second membrane stage and third membrane stage, each contains a plurality of gas separation membranes made of one or more of fluoropolymers, copolymers of polyether-polyamide, polyimides, and polymers of intrinsic morphology (PIMs) having a $CO_2$/methane selectivity of at least 10 and a $CO_2$ permeance of at least 50 GPU.

In some embodiments, the first membrane stage, second membrane stage and third membrane stage, each contains a plurality of gas separation membranes, each of the plurality of gas separation membranes is a composite hollow fiber membrane comprising a separation layer disposed on a substrate layer, the separation layer being made of one or more of fluoropolymers, copolymers of polyether-polyamide, polyimides, and polymers of intrinsic morphology (PIMs), the substrate layer being made of one or more of polysulfone, polyvinyledene fluoride, a polyimide, polyether ketone, and polyether ether ketone.

In some embodiments, the system further comprises a recycle gas reactor, configured to inject the compressed stream into the digestate sludge phase in the anaerobic digester, wherein a driving force is provided and controlled to achieve a pressure difference between an exterior and interior of the recycle gas injector.

In some embodiments, a pressure of the compressed combination stream is slightly greater than the operation pressure of the anaerobic digester.

In some embodiments, a pressure of the compressed second permeate stream is slightly greater than the operation pressure of the anaerobic digester.

In some embodiments, a pH adjusting chemical is added to the anaerobic digester, wherein the pH adjusting chemical is a strong base selected from magnesium hydroxide, sodium hydroxide, quicklime, lime, calcium hydroxide.

In some embodiments, a pH adjusting chemical is added to the anaerobic digester, wherein the pH adjusting chemical is a sodium salt of carbonic acid selected from sodium bicarbonate or sodium carbonate.

In some embodiments, pressure differences across the first membrane stage, across the second membrane stage and across the third membrane stage serve as a driving force to separate the biogas, the first residue stream and the first permeate stream, respectively.

In some embodiments, the anaerobic digester is a pressurized anaerobic digestion reactor suitable for operation under a pressure greater than atmosphere pressure.

There is also disclosed a membrane separation process for upgrading biogas from an anaerobic digester, the process comprising the steps of:

feeding a feedstock having an organic content to the anaerobic digester;

generating the biogas comprising $CH_4$ and $CO_2$ from the anaerobic digester under an operation pressure greater than atmosphere pressure;

feeding the biogas to a first membrane stage, wherein the biogas is separated into a first residue stream enriched in $CH_4$ and a first permeate stream enriched in $CO_2$ compared to the biogas;

feeding the first residue stream from the first membrane stage to a second membrane stage, wherein the first residue stream is separated into a second residue stream enriched in $CH_4$ and a second permeate stream enriched in $CO_2$ compared to the first residue stream;

compressing the second permeate stream from the second membrane stage; and recycling the compressed second permeate stream back to the bottom volume of digestate sludge phase in the anaerobic reactor.

In some embodiments, the operation pressure is greater than 4 bara.

In some embodiments, the second residue stream from the second membrane stage has a purity greater than 98% $CH_4$.

In some embodiments, the process further comprises:

feeding the first permeate stream to a third membrane stage, wherein the first permeate stream is separated into a third residue stream containing $CO_2$ and $CH_4$ and a third permeate gas enriched in $CO_2$;

compressing a combination stream of the third residue stream the third membrane stage and the second permeate stream from the second membrane stage; and recycling the compressed combination stream back to the bottom volume of the digestate sludge phase in the anaerobic reactor, wherein a pressure difference across the third membrane stage serves as a driving force to separate the first permeate stream.

In some embodiments, the second residue stream from the second membrane stage has a purity greater than 99% $CH_4$.

In some embodiments, a pressure of the compressed combination stream is slightly greater than the operation pressure of the anaerobic digester.

In some embodiments, the process further comprises adding a pH adjusting chemical to the feedstock, wherein the pH adjusting chemical is a strong base selected from magnesium hydroxide, sodium hydroxide, quicklime, lime, calcium hydroxide or a sodium salt of carbonic acid selected from sodium bicarbonate or sodium carbonate.

In some embodiments, pressure differences across the first membrane stage, across the second membrane stage and across the third membrane stage serve as a driving force to separate the biogas and the first residue stream.

There is also disclosed a membrane separation process for upgrading biogas from an anaerobic digester, the process comprising the steps of:

feeding a feedstock having an organic content to the anaerobic digester;

generating the biogas from the anaerobic digester under an operation pressure greater than 4 bara, wherein the biogas contains 70% or more $CH_4$;

feeding the biogas to a single membrane stage, wherein the biogas is separated into a residue stream enriched in $CH_4$ and a permeate stream enriched in $CO_2$, wherein a pressure of the permeate side of the single membrane stage is atmosphere pressure;

compressing the permeate stream from the single membrane stage; and recycling the compressed permeate stream back to the bottom volume of digestate sludge phase in the anaerobic reactor.

In some embodiments, the residue stream from the single membrane stage is enriched in methane ($CH_4$), having a purity greater than 98% $CH_4$.

In some embodiments, the residue stream from the single membrane stage is enriched in methane ($CH_4$), having a purity greater than 99% $CH_4$.

In some embodiments, the process further comprises adding a pH adjusting chemical to the anaerobic digester, wherein the pH adjusting chemical is a strong base selected from magnesium hydroxide, sodium hydroxide, quicklime, lime, calcium hydroxide or a sodium salt of carbonic acid selected from sodium bicarbonate or sodium carbonate.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
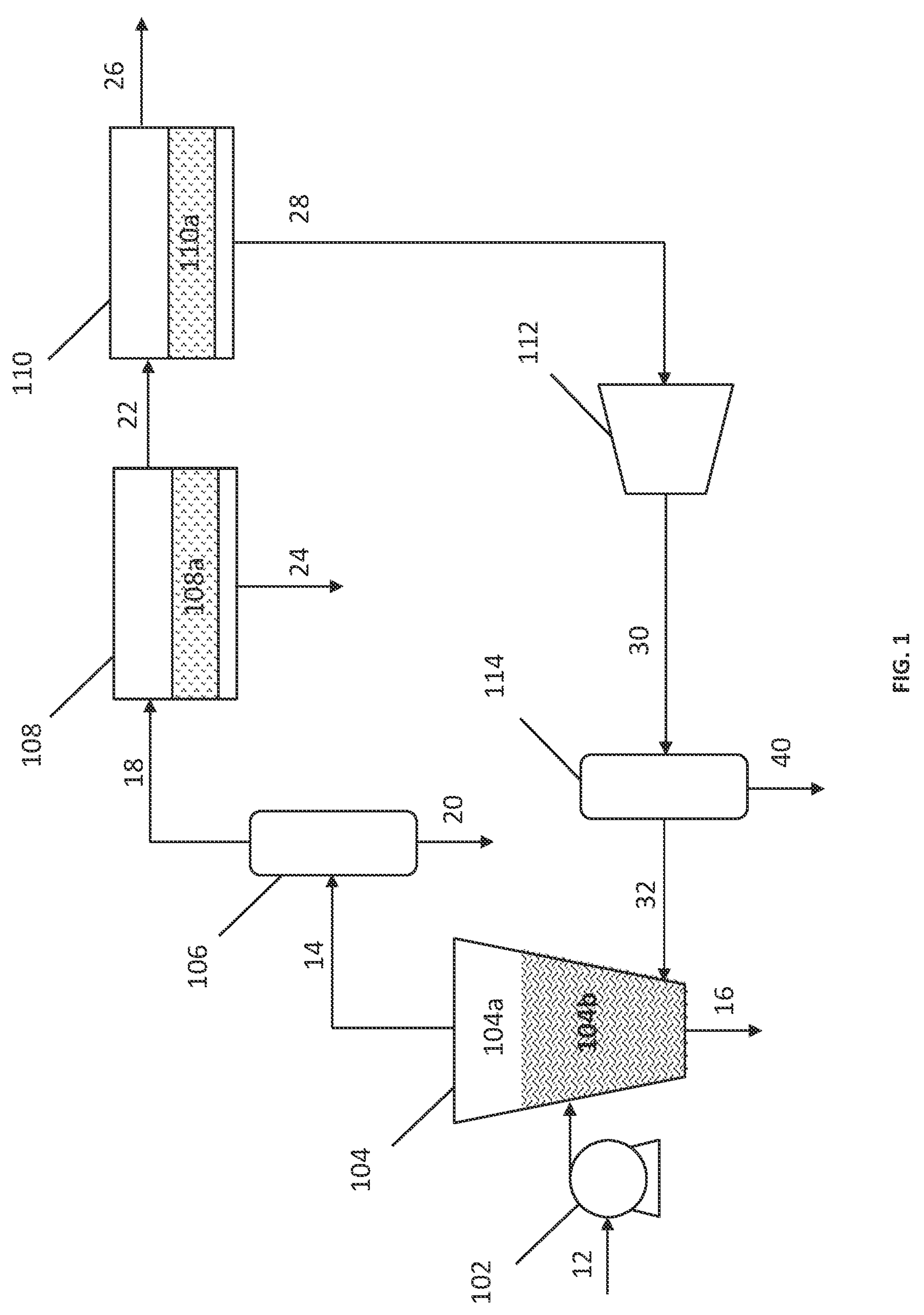
FIG. 1 is a block diagram of an exemplary embodiment of a two-stage membrane separation anaerobic digestion system operating at a pressure ranging from 5 to 10 bara for purifying biogas in accordance with the present invention.

Disclosed is a membrane separation process or method for upgrading a product gas generated from an anaerobic digester where the anaerobic digester operates under a pressure greater than 4 bara. The product gas may be a biogas that is composed mostly of methane ($CH_4$, the same compound in natural gas), and carbon dioxide ($CO_2$). The $CH_4$ content of raw (untreated) biogas may typically vary from 40%-70%, with $CO_2$ making up most of the remainder along with small amounts of water vapor and other gases. The disclosed membrane separation process achieves i) enrichment of a $CH_4$ concentration in the biogas as a residue stream; ii) recycle of enriched $CO_2$, $H_2$, $H_2S$ and polar organics, such as alcohols, ketones, in permeate to the anaerobic digester. The disclosed membrane separation process is operated at a pressure greater than atmosphere pressure, preferably greater than 4 bara. In some embodiments, the operation pressure may range from 5 to 10 bara; in some embodiments, the operation pressure may range from 7 to 15 bara. With appropriate processing inputs (biomass type, digestion conditions), high pressure anaerobic digesters may yield biogas with higher $CH_4$ concentration than achievable in ambient pressure digesters.

The disclosed membrane separation method may comprise a two membrane stages for upgrading a biogas generated from an anaerobic digester where the anaerobic digester operates under a pressure greater than 4 bara. More specifically, the disclosed process comprises a recirculation of $CO_2$-enriched permeate gases back to the anaerobic digester, which assists mixing of digestate sludge phase in the anaerobic digester and accelerates a release of dissolved $CO_2$ into an anaerobic digestion headspace phase of the anaerobic digester, thereby preventing pH drop by the dissolved $CO_2$ build-up in the digestate sludge phase in the anaerobic digester that may happen in existing pressurized anaerobic digester applications. The disclosed process is simple to operate so that it may be installed economically on small anaerobic digesters such as anaerobic digesters operating on food or agricultural wastes.

Depending on a $CH_4$ content of raw (untreated) feedstock or pre-treated biogas feed and a desired amount of $CO_2$ to be recycled, the disclosed membrane separation process may use different numbers of membrane stages other than two membrane stages under different pressure ranges, such as, a single membrane stage, or a three membrane stage. If a high $CH_4$ content of pre-treated biogas feed is available, for example, higher than 70% $CH_4$ content, the disclosed membrane separation process may use the single membrane stage operating under a pressure range of 7 to 15 bara. If a high recovery of residue stream and a high recycle of permeate gas ($CO_2$) are desired, the disclosed membrane separation process may use a three membrane stage operating under a pressure range of 7 to 15 bara.

Each membrane stage may consist of one or more membrane modules or a plurality of gas separation membranes in membrane vessels. In one embodiment, the membrane module may be a flat sheet module e.g. plate-frame or spiral wound or preferably a hollow fiber device with high membrane area/volume. The hollow fiber (HF) may be a monolithic asymmetric hollow fiber or preferably a composite HF, fabricated by methods known to practitioners by extrusion or coating technologies. The composite HF core or substrate may preferably be polysulfone, polyvinyledene fluoride, polyimide or poly ether ketone or poly ether ketone. The composite HF sheath or coating may preferably be a fluoropolymer, a copolymer of polyether-polyamide, a polyimide, or polymer of intrinsic morphology (PIM). The membranes are preferably made of one or more of fluoropolymers, copolymers of polyether-polyamide, polyimides, or polymers of intrinsic morphology (PIMs) having a $CO_2$/methane selectivity of at least 10 and a $CO_2$ permeance of at least 50 GPU.

In an alternative embodiment, the membrane is a composite membrane comprising a separation layer disposed on a substrate layer. The separation layer is made of one or more of fluoropolymers, copolymers of polyether-polyamide, polyimides, and polymers of intrinsic morphology (PIMs). The substrate layer is made of one or more of polysulfone, polyvinyledene fluoride, a polyimide, polyether ketone, and polyether ether ketone. Furthermore, the separation layer is made of one or more of fluoropolymers, copolymers of polyether-polyamide, polyimides, or polymers of PIMs having a $CO_2$/methane selectivity of at least 10 and a $CO_2$ permeance of at least 50 GPU.

An exemplary embodiment of the disclosed anaerobic digester system operating under a pressure ranging from 5 to 10 bara for a membrane separation system for purifying biogas is shown in FIG. 1. Here a feedstock fed to the anaerobic digester has an organic content that may consists of $CH_4$, $CO_2$, smaller amounts of $N_2$, and trace levels of $H_2S$, $NH_3$, $H_2$, and various volatile organic compounds. In this embodiment, the feedstock may contain 50-60% $CH_4$. As shown, feedstock 12 is fed into a first inlet of anaerobic digester 104 via slurry pump 102. Feedstock 12 may be food waste, agricultural waste, or the like. Feedstock 12 may be liquefied or partially liquefied by pretreatment methods including mechanical (e.g., milling, grinding, lysing, high pressure introduction, microwave, ultra-sound, etc.), thermochemical (i.e., heating with or without chemicals), or biological (e.g., enzyme or fungal pretreatment) treatment. Anaerobic digester 104 is a high pressure or pressurized anaerobic digestion reactor, a high pressure or pressurized anaerobic digester or a high pressure or pressurized fermentation tank that is suitable for operation under a pressure ranging from 5 to 10 bara. Anaerobic digester 104 includes anaerobic digestion headspace 104*a* and digestate sludge phase 104*b*. Slurry pump 102 may be any types of existing slurry pumps. Feedstock 12 is then anaerobically digested in anaerobic digester 104, producing excess digestate 16 that is discharged from anaerobic digester 104 and biogas 14 at 5 to 10 bara that is vented out from the top of anaerobic digester 104 and filtered by filter 106. Anaerobic digester 104 has the first inlet to receive the pumped fed feedstock to digestate sludge phase 104*b*, which is located around the middle or upper portion of the vertical sidewall of anaerobic digester 104. Depending on the volume of digestate sludge phase 104*b* in anaerobic digester 104, the first inlet may connect to the body of sludge phase 104*b*, as shown; or the first inlet may not connect to the body of digestate sludge phase 104*b*, instead, the first inlet may connect to anaerobic digestion headspace 104*a*. Anaerobic digester 104 includes a second inlet located in the bottom portion of the vertical sidewall that connects to the bottom volume of digestate sludge phase 104*b* to receive a compressed and filtered permeate gas 32 (described below) back to the anaerobic digester. Anaerobic digester 104 also includes a first outlet in the bottom of the digester to discharge excess digestate 16 out, and a second outlet on the top of the digester that connects to anaerobic digester headspace 104*a* to vent out produced biogas 14. Biogas 14 also refers to a product gas, which contains $CH_4$, $CO_2$ and other gases. Filtered biogas 14 or biogas feed 18 then is fed to first membrane stage 108 (referring to Stage 1) through a feed gas conduit and passes across the residue side of first membrane stage 108 where biogas feed 18 is separated to residue stream 22 and permeate stream 24 by membrane module 108*a*. The first membrane stage 108 is a $CO_2$ selective membrane vessel. Filtered waste 20 is discharged from filter 106 in either a continuous or intermittent mode. Residue stream 22 from first membrane stage 108, enriched in $CH_4$ and depleted in $CO_2$ compared with biogas feed 18, is withdrawn from the residue side of first membrane stage 108. Permeate stream 24, enriched in $CO_2$ and depleted in $CH_4$ compared with biogas feed 18, is withdrawn from the permeate side of first membrane stage 108. Transmembrane permeation occurs because permeate stream 24 is at a lower pressure than biogas feed 18. Here, the permeate side of first membrane stage 108 is at ambient pressure (~1 bar); thus allowing biogas feed 18 to permeate through first membrane stage 108. Depending on the $CO_2$ level, the ~1 bar permeate stream 24 from first membrane stage 108 may be directly vented or preferably first used for flushing or regeneration of pretreatment adsorption unit (not shown), then vented, or processed further for $CO_2$ purification. Residue stream 22 from first membrane stage 108, which penetrates through first membrane stage 108, is enriched in methane ($CH_4$) and has a pressure ranging from 4-9 bara, is further fed to the residue side of second membrane stage 110 (referring to Stage 2). Second membrane stage 110 is $CO_2$ selective membrane vessel. Residue stream 26, enriched in $CH_4$ and depleted in $CO_2$ compared with residue stream 22, is withdrawn from the residue side of second membrane stage 110. Permeate stream 28, enriched in $CO_2$ and depleted in $CH_4$ compared with residue stream 22, is withdrawn from the permeate side of second membrane stage 110. Transmembrane permeation occurs because the pressure of the permeate side of second membrane stage 110 is lower than the pressure of residue stream 22. Here, the permeate side of second membrane stage 110 is at ambient pressure (~1 bar); thus allowing residue stream 22 to permeate through second membrane stage 110. Permeate stream 28 from second membrane stage 110 is then recompressed to slightly greater than 5 to 10 bara by compressor 112 (recycle stream 30) and recycled to the bottom volume of digestate 104*b* in anaerobic digester 104 after optional polishing (absorptive or adsorptive process in device 114) for removal of impurities 40 such as $H_2S$ (recycle stream 32) for recycling. A recycle gas injector (not shown) may be provided for injecting recycle stream 32 to anaerobic digester 104. Here, a driving force is provided and controlled to achieve a pressure difference between an exterior and interior of the recycle gas injector so that recycled stream 32 of permeate gas 28 is injected by the recycle gas injector into digestate sludge phase 104*b* in anaerobic digester 104. Residue stream 26 from second membrane stage 110, is enriched in methane ($CH_4$) having a purity greater than 98% and has a pressure ranging from 4-9 bara, may be utilized directly, e.g. sent to combustion or processed further for stringent applications, such as, a natural gas pipeline or compressed natural gas (CNG) applications. Typical and preferred conditions, but not full range of variables, of the gas streams coming out of each device in this exemplary membrane separation system operating under a pressure ranging from 5 to 10 bara are listed in Table 1.

TABLE 1

| Gas stream | Pressure [psia] | Flow relative to biogas feed 18 | $CO_2$ range [%] |
|---|---|---|---|
| 18 | 5-10 | 1 | 20-50 |
| 22 | 4.5-9.5 | 0.5-0.8 | 10-30 |
| 24 | 1-2 | 0.2-0.5 | 60-95 |
| 26 | 4-9 | 0.4-0.55 | 1-5 |
| 28 | 1-2 | 0.1-0.4 | 40-60 |
| 30 | 5-10.5 | 0.1-0.4 | 40-60 |

Figure 2:
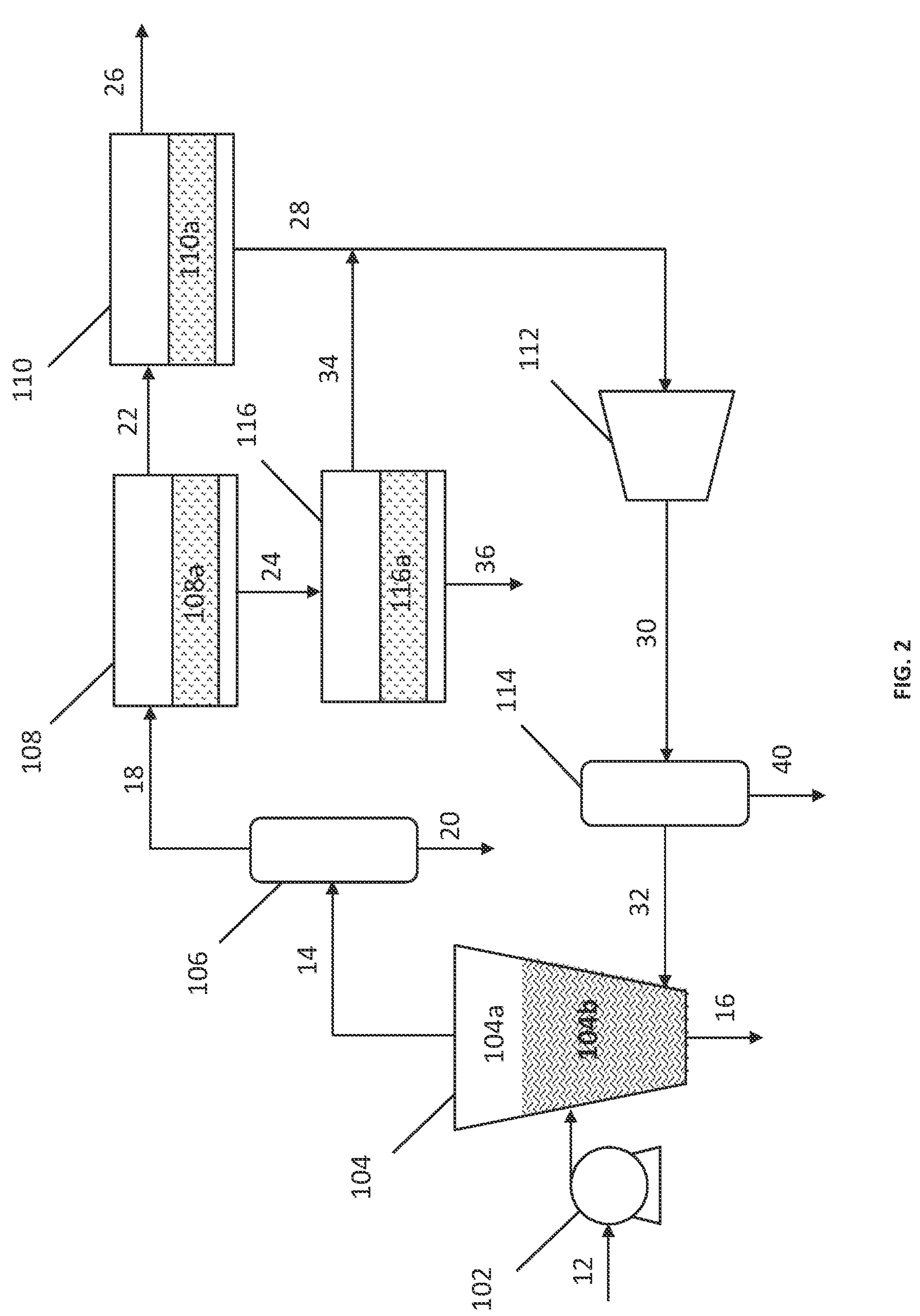
FIG. 2 is a block diagram of an exemplary embodiment of a three stage membrane separation anaerobic digestion system operating at a pressure ranging from 7 to 15 bara for purifying biogas in accordance with the present invention.

FIG. 2 is an exemplary embodiment of the disclosed membrane separation system operating under a pressure ranging from 7 to 15 bara using a three membrane stage. Here a feedstock may contains 50 to 75% $CH_4$. In this embodiment, the anaerobic digestion with membrane separation process operates at a high pressure ranging from 7 to 15 bara greater than the pressure of the embodiment shown in FIG. 1 and third membrane stage 116 is added. Utilizing the third membrane stage increases the amount of $CH_4$ that may be recovered. All membrane stages are $CO_2$ selective. Similarly, Anaerobic digester 104 is a high pressure or pressurized anaerobic digestion reactor, a high pressure or pressurized anaerobic digester or a high pressure or pressurized fermentation tank that is suitable for operation under a pressure ranging from 7 to 15 bara. Third membrane stage 116 is utilized at intermediate pressure for further purifying permeate stream 24 from first membrane stage 108. Not repeating the same portions as that of FIG. 1, biogas feed 18 at 7 to 15 bara then passes through first membrane stage 108. The permeate side of first membrane stage 108 is at an intermediate pressure (e.g., 2-4 bara), thus allowing biogas feed 18 to permeate through first membrane stage 108 forming permeate stream 24. Permeate 24 is fed to the residue side of third membrane stage 116 as a feed gas. Residue stream 34 from the residue side of third membrane stage 116 enriched in $CH_4$ and depleted in $CO_2$ compared with permeate stream 24, is withdrawn from the residue side of third membrane stage 116. Permeate stream 36, enriched in $CO_2$ and depleted in $CH_4$ compared with permeate stream 24, is withdrawn from the permeate side of third membrane stage 116. Permeate stream 36 from the permeate side of third membrane stage 116 is highly enriched $CO_2$ and vented out or further processed for its $CO_2$ value. Transmembrane permeation occurs because permeate stream 36 is at a lower pressure than permeate stream 24. Second membrane stage 110 serves the same function as described for the one in FIG. 1. In this embodiment, permeate stream 28 from the permeate side of second membrane stage 110 and residue stream 34 from the residue side of third membrane stage 116 are combined, recompressed by compressor 112 to slightly greater than 7 to 15 bara (recycled stream 30) and introduced to the bottom volume of anaerobic digester 104 (recycled stream 32) after optional polishing (absorptive or adsorptive process in device 114) for removal of impurities 40 such as $H_2S$ for recycling. Here the amount of $CO_2$ concentration in residue stream 34 from third membrane stage 116 is close to the amount of $CO_2$ concentration in permeate stream 28 from second membrane stage 110, which are shown in the Examples that follow. A recycle gas injector (not shown) may be provided for injecting recycle stream 32 to anaerobic digester 104. Here, a driving force is provided and controlled to achieve a pressure difference between an exterior and interior of the recycle gas injector so that recycled stream 32 of the combination of permeate gas 28 and residue stream 34 may be injected by the recycle gas injector into the digestate sludge phase in anaerobic digester 104. Residue stream 26 having a purity greater than 99% from the residue side of second membrane stage 110 may be utilized directly, e.g. sent to combustion or processed further for stringent applications, such as, a natural gas pipeline or CNG applications. Typical/preferred conditions, not full range of variables, of the gas streams coming out of each device in this exemplary membrane separation process operating under a pressure ranging from 7 to 15 bara are listed in Table 2.

TABLE 2

| Stream | Pressure [bara] | Flow relative to biogas feed 18 | $CO_2$ range (%) |
|---|---|---|---|
| 18 | 7-15 | 1 | 10-50 |
| 22 | 6.5-14.5 | 0.5-0.9 | 5-30 |
| 24 | 2-4 | 0.2-0.5 | 80-95 |
| 26 | 6-14 | 0.4-0.9 | <2 |
| 28 | 1-2 | 0.1-0.3 | 30-50 |
| 30 | 7-15.5 | 0.2-0.5 | 30-70 |
| 34 | 1.5-3.5 | 0.05-0.4 | 40-80 |
| 36 | 1-1.5 | 0.1-0.5 | 97+ |

Figure 3:
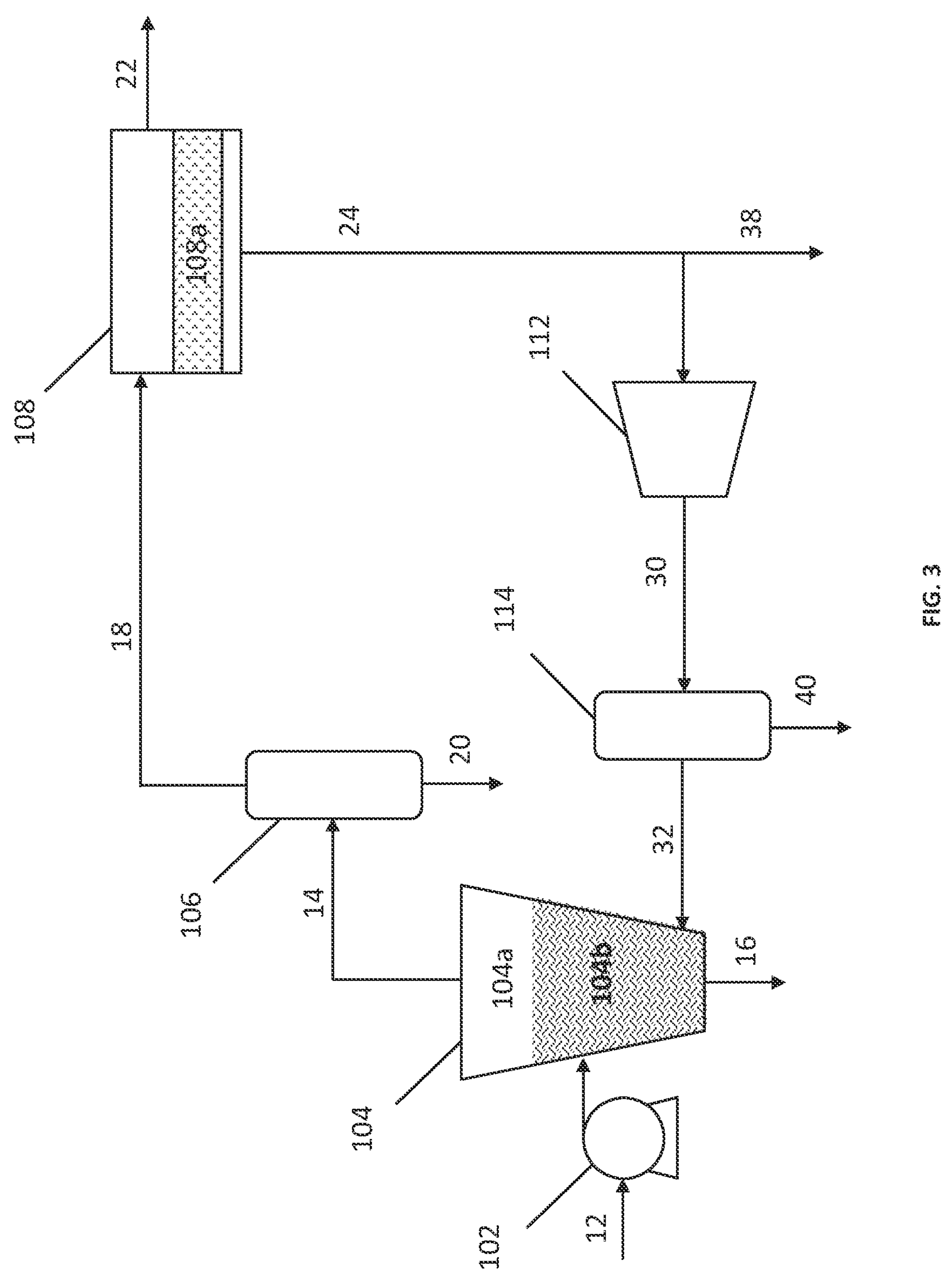
FIG. 3 is a block diagram of an exemplary embodiment of a single stage membrane separation anaerobic digestion system operating at a pressure ranging from 7 to 15 bara for purifying biogas with a high content of $CH_4$ in accordance with the present invention.

FIG. 3 is an exemplary embodiment of the disclosed membrane separation system operating at a pressure ranging from 7-15 bara with a single membrane stage, which is similar in some aspects to FIG. 1 but particularly suited to biogas feed 18 with a $CH_4$ purity >70%. With appropriate processing inputs (biomass type, digestion conditions), high pressure or pressurized digesters may yield biogas with higher $CH_4$ concentration than achievable in ambient pressure digesters. At sufficiently high $CH_4$ concentration in biogas feed 18, a two-stage membrane process configuration as shown in FIG. 1, may not be necessary and a single stage membrane configuration as shown in FIG. 3 may be more desirable in terms of separation cost efficiency. This embodiment utilizes a single stage membrane process configuration and is particularly suited when the biogas feed from the pressurized anaerobic digester contains >70% $CH_4$.

In this embodiment, the anaerobic digestion with membrane separation process operates at a pressure ranging from 7 to 15 bara, which is greater than the pressure in the embodiment shown in FIG. 1. As shown, Anaerobic digester 104 is a high pressure or pressurized anaerobic digestion reactor, a high pressure or pressurized anaerobic digester or a high pressure or pressurized fermentation tank that is suitable for operation under a pressure ranging from 7 to 15 bara. Not repeating the same portions as that of FIG. 1, biogas feed 18 at 7 to 15 bara then passes through single membrane stage 108. Here single membrane stage 108 may be a $CO_2$ selective membrane. The permeate side of single membrane stage 108 is at a lower pressure (e.g., 1-2 bara), thus allowing biogas feed 18 to permeate through single membrane stage 108 forming permeate stream 24. Residue stream 22 from single membrane stage 108, enriched in $CH_4$ and depleted in $CO_2$ compared with biogas feed 18, is withdrawn from the residue side of single membrane stage 108. Permeate stream 24, enriched in $CO_2$ and depleted in $CH_4$ compared with biogas feed 18, is withdrawn from the permeate side of single membrane stage 108. Transmembrane permeation occurs because permeate stream 24 is at a lower pressure than biogas feed 18. Here, the permeate side of single membrane stage 108 is at ambient pressure (~1 bar); thus allowing biogas feed 18 to permeate through single membrane stage 108. Depending on the $CO_2$ level, permeate stream 24 from single membrane stage 108 may be injected to the bottom volume of anaerobic digester 104 by a recycle gas injector (not shown) after recompressed to slightly higher than 7 to 15 bara by compressor 112 (stream 30) and optionally polished (absorptive or adsorptive process in device 114) for removal of impurities 40 such as $H_2S$. The recycle gas injector may be provided for injecting recycle stream 32 to anaerobic digester 104. Here, a driving force is provided and controlled to achieve a pressure difference between an exterior and interior of the recycle gas injector so that recycled stream 32 of permeate gas 24 may be injected by the recycle gas injector into the digestate sludge phase in anaerobic digester 104. Depending on the $CO_2$ concentration, a part of the ~1 bar permeate stream 24 from single membrane stage 108 may also be vented out (stream 38) for use as a low grade fuel gas. Depending on the $CO_2$ concentration, residue stream 22 from single membrane stage 108, which penetrates through single membrane stage 108, is enriched in methane ($CH_4$), and depleted in $CO_2$ compared with biogas feed 18, and has a pressure ranging from 6-14 bara, is withdrawn from the residue side of single membrane stage 108 and may be utilized directly, e.g. sent to combustion or processed further for stringent applications, such as, a natural gas pipeline or CNG applications. Typical/preferred conditions, not full range of variables, of the gas streams coming out of each device in this exemplary membrane separation process operating at a pressure ranging from 7 to 15 bara are listed in Table 3.

TABLE 3

| Stream | Pressure [bara] | Flow relative to biogas feed 18 | $CO_2$ range (%) |
|---|---|---|---|
| 18 | 7-15 | 1 | 10-30 |
| 22 | 6.5-14.5 | 0.6-0.9 | <5 |
| 24 | 1-2 | 0.1-0.4 | 40-70 |

TABLE 3-continued

| Stream | Pressure [bara] | Flow relative to biogas feed 18 | $CO_2$ range (%) |
|---|---|---|---|
| 30 | 7-15.5 | <0.4 | 40-70 |
| 38 | 1-2 | <0.4 | 40-70 |

In the disclosed membrane separation process, the pH value of the digestate is maintained between 7 and 8 for a stable performance of anaerobic digestion to maintain a desired high rate of biogas production prior to feeding to the membrane system. Chemicals may be added into a feedstock feeding line before being added into the digester system when the pH of the digestate decreases below 7 due to an accidental accumulation of dissolved $CO_2$ in the digestate phase of the digester. Basic chemicals or sodium salts of carbonic acid may be used to increase the pH of the digestate. Addition of these chemicals increases the pH of the digestate by shifting dissolved $CO_2$ to carbonate ions and/or increasing alkalinity. The basic chemicals herein are strong bases such as magnesium hydroxide, sodium hydroxide, quicklime, lime, calcium hydroxide. Sodium salts of carbonic acid are sodium bicarbonate and sodium carbonate. These chemicals are mixed with water to be served in a slurry form.

It is known that organic contents in food or agricultural wastes are metabolized via chain reactions in anaerobic digestion process: hydrolysis, acidogenesis, acetogenesis, and methanogenesis. In the disclosed process, the anaerobic digestion process may be done a single vessel or a single container or a single stage in which the entire biogas conversion reaction from hydrolysis to methanogenesis is conducted. Alternatively, the anaerobic digestion process may be partitioned or arranged as two separate containers or stages. The first container or stage is optimized for dark fermentation to produce biohydrogen; while the second container or stage is optimized for methanogenesis to produce biomethane. In the two-stage scenario, the recycled $CO_2$ enriched gas from the membrane(s) is introduced to the bottom volume of the second container.

The disclosed membrane separation process may be performed in a single stage or a two-stage anaerobic digester configuration depending on the type of a final biogas product. In the single stage anaerobic digestion process, all intermediate metabolites are consumed by the chain reactions, and $CH_4$ and $CO_2$ are produced as final biogas products. On the other hand, the two-stage anaerobic digestion process produces $H_2$ and $CO_2$ in the $1^{st}$ dark fermentation reactor and $CH_4$ and $CO_2$ in the $2^{nd}$ methanogenic reactor. By utilizing different conditions, such as pH, temperature and hydraulic retention time, one may separate biological reactions, and obtain hydrogen enriched and methane enriched gases from two stages separately. Anaerobic microorganisms in the anaerobic digester may be retained in suspension or on fixed media carrier. A part of contents is usually wasted as excess digestate (E.g., excess digestate 16) for further treatments. In the two-stage anaerobic digestion process, the content of the $2^{nd}$ anaerobic digester may be recycled back to the $1^{st}$ dark fermentation anaerobic digester for a pH buffer. A suspension in the anaerobic digester is well mixed by mechanical mixers and/or gas injection devices and the produced biogas in the suspension is released into a gas phase at the headspace of the two anaerobic digesters. The removal of $CO_2$ and $H_2$ in the first stage shifts the reactions to favor the production of $H_2$. Additionally, to give the favorable condition of $CH_4$ production in the second stage, the product gas or biogas in the headspace is removed from the second anaerobic digester through the membrane module, and after $CH_4$ purification, remaining biogas may be recycled back to the anaerobic digester to assist mixing the suspension and to provide favorable substances ($CO_2$) for biological reactions/digestion.

Here, the advantages of recycling $CO_2$ back to the anaerobic digestion reactor is reduction in $CO_2$ emissions and improvement of the $CH_4$ yield. More specifically,

- Supply of $CO_2$ as a carbon source for autotrophic (hydrogenotrophic) methanogenesis, thus improving the methane gas yield: $CO_2+4H_2 \rightarrow CH_4+2H_2O$.
- Supply of $CO_2$ for homoacetogenesis to produce acetate: $4H_2+2CO_2 \rightarrow CH_3COOH+2H_2O$. Then, acetate is converted into $CH_4$ and $CO_2$ by heterotrophic (acetoclastic) methanogenesis: $CH_3COOH \rightarrow CH_4+CO_2$. Thus, reducing $CO_2$ generation and improving $CH_4$ production: $4H_2+CO_2 \rightarrow CH_4+2H_2O$.

The relatively small recycled permeate gas may also be polished via absorption in chemical or physical solvents or treated by catalytic or adsorptive processes to remove contaminants such as $H_2S$ before introduction in the anaerobic digester. The recycled gas provides a beneficial agitation of anaerobic digestion reactor contents.

When the membrane separation process is operated at a higher pressure, such as 5 to 10 bara or 7 to 15 bara, a greater purification of the biogas may be possible and capital expenditures and operating expenses (CAPEX/OPEX) of a biogas compressor is avoided.

The membrane scheme operation was modelled though an Air Liquide software. For this modelling, minor components were ignored and the biogas was considered to be a 50/50 (v/v) $CO_2/CH_4$ binary gas. In the examples that follow, pressures are approximate and will vary to account for piping friction losses, pressure drop in ancillary equipment and water head in the anaerobic digestion reactor.

The disclosed membrane separation methods is suitable for $CO_2$ selective gas separation for biogas upgrading, but is not limited to. The disclosed membrane separation methods may be suitable for other gas selective separations, such as $NH_3$, $H_2$, or the like.

EXAMPLES

The following non-limiting examples are provided to further illustrate embodiments of the invention. However, the examples are not intended to be all inclusive and are not intended to limit the scope of the inventions described herein.

Example 1: High Purity Product with High Selectivity Membranes

Referring to FIG. 1, this example operates the membrane separation process at 8.9 bara by feeding feedstock 12 to anaerobic digester 104 with slurry pump 102. Anaerobic digester 104 is operated at a high pressure ranging from 5 to 10 bara so product gas or biogas 14 is available at pressure without necessity of significant further compression. The two sequential membrane stages, first and second membrane stage 108, 110, are used. In this example, both first and second membrane stage 108, 110 are hollow fiber devices with 165 micron outer diameter fibers having 80 GPU (gas permeance unit) $CO_2$ and 2 GPU $CH_4$. The membrane area ratio between first and second membrane stage 108, 110 is 1:4.

Biogas feed 18 at 8.9 bara is fed to first membrane stage 108 with permeate side at 1.0 bara. Permeate stream 24 from the permeate side of first membrane stage 108 which has a high $CO_2$ concentration (94.3%) is ultimately vented leading to 4% loss of the $CH_4$ comparing to biogas feed 18 entering first membrane stage 108 (Stage 1 feed). Residue 22 from first membrane stage 108 at 7.9 bara is fed to the residue side of second membrane stage 110 with the permeate side of second membrane stage 110 at 1.0 bara. Permeate stream 28 from the permeate side of second membrane stage 110 which is 26% of incoming feed biogas feed 18 to the membrane system including two stages of first membrane stage 108 and second membrane stage 110 and has a $CO_2$ concentration of 62% is recompressed to 9 bara by compressor 112 and introduced to the bottom volume of anaerobic digester 104. As shown in process simulation results in Table 4 below, this example is well suited to give a high purity product of $CH_4$.

TABLE 4

| | Feed 18 (Stg1) | Res 22 (Stg1) | Perm 24 (Stg1) | Res 26 (Stg2) | Perm 28 (Stg2) | AD Recycle 32 |
|---|---|---|---|---|---|---|
| Molar Flow [$Nm^3$/h(gas)] | 100 | 64.8 | 35.2 | 38.3 | 26.4 | 26.4 |
| Pressure [bara] | 8.9 | 7.9 | 1.0 | 7.8 | 1.0 | 9.0 |
| Comp Mole Frac ($CH_4$) | 50.0% | 74.1% | 5.7% | 98.8% | 38.4% | 38.4% |
| Comp Mole Frac ($CO_2$) | 50.0% | 25.9% | 94.3% | 1.2% | 61.6% | 61.6% |

In this process simulation, a product purity of 98.8% $CH_4$ in residue 26 from second membrane stage 110 is obtained, which would require 3.6 $m^2$ membrane area per $nm^3$/h of feed biogas and a specific power of only 0.082 kW per $nm^3$/h of $CH_4$ in purified biomethane residue stream 26. This specific power refers only to permeate stream 28 recompression and does not include the power requirement of slurry pump 102 feeding liquid biomass feed 12 to anaerobic digester 104. This simulation achieves ~94% $CH_4$ in product with 4% $CH_4$ loss in vent gas (Stage 1 permeate) and 26% recycle flow (Stage 2 permeate) back to anaerobic digester 104.

Example 2: High Purity Product with Recovery Using High Selectivity Membranes

Referring to FIG. 3, this example is useful for high $CO_2$ recovery and high purity of the desired $CH_4$ product. This example operates the anaerobic digestion process at 11.4 bara by feeding feedstock 12 to anaerobic digester 104 with slurry pump 102. FIG. 3 uses 2 sequential membrane stages, first and second membranes 108 and 110. Third membrane stage 116 operates at an intermediate pressure and further purifies permeate 24 from first membrane stage 108. In this example, all three membrane stages 108, 110 and 116 are hollow fiber devices with 165 micron OD fibers having 80 GPU $CO_2$ and 2 GPU $CH_4$. The membrane area ratio between first, second and third membrane stages 108, 110 and 116 is 3:5:3.

Biogas feed 18 at 11.4 bara is fed to first membrane stage 108 with the pressure of permeate side 108*a* at 3.1 bara. Residue 22 from first membrane stage 108 is fed to second membrane stage 110 with the pressure of permeate side 110*a* at 1.0 bara. Residue 26 from second membrane stage 110 is a high purity $CH_4$ product. Permeate 24 from first membrane stage 108 is directed to the feed inlet of third membrane stage 116 which has 1.0 bara permeate pressure. Permeate stream 36 from third membrane stage 116 containing small amount of $CH_4$ is vented or used elsewhere in the process, for example as a dryer regeneration gas. Residue 34 from third membrane stage 116 and permeate stream 28 from second membrane stage 110 are combined and recompressed by compressor 112 to 11.4 bara and introduced to the bottom volume of anaerobic digester 104. As shown in the process simulation results in Table 5 below, this example is well suited to give a high purity product of $CH_4$ with high recovery of $CO_2$.

TABLE 5

| | Feed 18 (Stg1) | Res 22 (Stg1) | Perm 24 (Stg1) | Res 26 (Stg2) | Perm 28 (Stg2) | Res 34 (Stg3) | Perm 36 (Stg3) | AD Recycle 32 |
|---|---|---|---|---|---|---|---|---|
| Molar Flow [$Nm^3$/h(gas)] | 100 | 60.7 | 39.3 | 36.0 | 24.7 | 10.2 | 29.0 | 34.9 |
| Pressure [bara] | 11.4 | 10.9 | 3.1 | 10.8 | 1.0 | 2.5 | 1.0 | 11.5 |
| Comp Mole Frac ($CH_4$) | 50.0% | 75.4% | 10.6% | 99.5% | 40.3% | 37.5% | 1.2% | 39.5% |
| Comp Mole Frac ($CO_2$) | 50.0% | 24.6% | 89.4% | 0.5% | 59.7% | 62.5% | 98.8% | 60.5% |

In this simulation, a product purity of 99.5% $CH_4$ in residue 26 from second membrane stage 110 is obtained, which would require 4.3 $m^2$ membrane area per $nm^3$/h of feed biogas and a specific power of only 0.13 kW per $nm^3$/h of $CH_4$ in the product. This specific power refers only to combined permeate recompression 30 and does not include the power requirement of slurry pump 102 feeding feedstock 12 to anaerobic digester 104. This simulation achieves 99.5% $CH_4$ in product with 0.7% $CH_4$ loss in vent gas (Stage 1 permeate) and 35% recycle flow (Stage 3 residue+Stage 2 permeate) back to anaerobic digester 104.

Example 3: High Purity Product with Moderate Selectivity and High Permeance Membranes Referring to FIG. 1, this example operates the anaerobic digestion process at 8~9 bara by feeding feedstock 12 to anaerobic digester 104 with slurry pump 102. Anaerobic digester 104 is operated at high pressure ranging from 5 to 10 bara so biogas 14 is available at pressure without necessity of significant further compression. In this example, both first and second membrane stages 108, 110 are hollow fiber devices with 350 micron OD fibers having 800 GPU $CO_2$ and 40 GPU $CH_4$. The membrane area ratio between first and second membrane stages 108, 110 is 1:2.

Biogas feed 18 at 8.9 bara is fed to first membrane stage 108 with the pressure of permeate side 108*a* at 1.0 bara. Permeate stream 24 from first membrane stage 108 which has a high $CO_2$ concentration (87%) is ultimately vented leading to 10% loss of the $CH_4$ entering the membrane system including two stages of first membrane stage 108 and second membrane stage 110. Residue 22 from first membrane stage 108 at ~7.9 bara is fed to second membrane stage 110 with the pressure of permeate side 110*a* at 1.0 bara permeate stream 28 which is 27% of incoming feed biogas feed 18 to the membrane system including two stages of first membrane stage 108 and second membrane stage 110 and has a $CO_2$ concentration of 52% is recompressed to 9 bara and introduced to the bottom volume of anaerobic digester 104. As shown in the process simulation results in Table 6 below, this example is well suited to give a high purity product of $CH_4$.

TABLE 6

| | Feed 18 (Stg1) | Res 22 (Stg1) | Perm 24 (Stg1) | Res 26 (Stg2) | Perm 28 (Stg2) | AD Recycle 32 |
|---|---|---|---|---|---|---|
| Molar Flow [$Nm^3$/h(gas)] | 100 | 59.5 | 40.5 | 32.8 | 26.7 | 26.7 |
| Pressure [bara] | 8.9 | 7.9 | 1.0 | 7.7 | 1.0 | 9.0 |
| Comp Mole Frac ($CH_4$) | 50.0% | 75.6% | 12.4% | 98.5% | 47.6% | 47.6% |
| Comp Mole Frac ($CO_2$) | 50.0% | 24.4% | 87.6% | 1.5% | 52.4% | 52.4% |

In this process simulation, a product purity of 98.5% $CH_4$ in residue stream 26 from second membrane stage 110 is obtained, which would require 0.3 $m^2$ membrane area per $nm^3$/h of feed biogas and a specific power of 0.098 kW per $nm^3$/h of $CH_4$ in the product. This specific power refers only to permeate stream 28 recompression and does not include the power requirement of slurry pump 102 feeding the liquid biomass feed to anaerobic digester 104. This simulation achieves ~98.5% $CH_4$ in product with 10% $CH_4$ loss in vent gas (Stage 1 permeate) and 27% recycle flow (Stage 2 permeate) back to anaerobic digester 104.

Example 4: High Purity Product with High Recovery Using High Permeance and Moderate Selectivity Membranes Referring to FIG. 3, this example operates the anaerobic digestion process at ~11.5 bara by feeding feedstock 12 to anaerobic digester 104 with slurry pump 102 and is useful for high recovery and high purity of the desired $CH_4$ product. FIG. 3 uses 2 sequential membrane stages 108 and 110. Membrane stage 116 operates at an intermediate pressure and further purifies permeate stream 24 from first membrane stage 108. In this example, all three membrane stages 108, 110 and 116 are hollow fiber devices with 350 micron OD fibers having 800 GPU $CO_2$ and 40 GPU $CH_4$. The membrane area ratio between first, second and third membrane stages 108, 110 and 116 is 3:5:3

Biogas feed 18 at 11.4 bara is fed to first membrane stage 108 with the pressure of permeate side 108*a* at 3.1 bara. Residue stream 22 from first membrane stage 108 is fed to second membrane stage 110 with the pressure of permeate side 110*a* at 1.0 bara. Then, a high purity $CH_4$ product of residue stream 26 from second membrane stage 110 is obtained. Permeate stream 24 from first membrane stage 108 is directed to the feed inlet of third membrane stage 116 which has a permeate pressure of 1.0 bara. Permeate gas 36 from third membrane stage 116 containing small amount of $CH_4$ is vented or used elsewhere in the process, for example as a dryer regeneration gas. Residue stream 34 from third membrane stage 116 and permeate stream 28 from second membrane stage 110 are combined and recompressed to 11.5 bara (stream 30) and introduced to the bottom volume of anaerobic digester 104. As shown in process simulation results in Table 7 below, this scheme is well suited to give a high purity product of $CH_4$ with high recovery of $CO_2$.

TABLE 7

| | Feed 18 (Stg1) | Res 22 (Stg1) | Perm 24 (Stg1) | Res 26 (Stg2) | Perm 28 (Stg2) | Res 34 (Stg3) | Perm 36 (Stg3) | AD Recycle 32 |
|---|---|---|---|---|---|---|---|---|
| Molar Flow [$Nm^3$/h(gas)] | 100 | 61.6 | 38.4 | 30.3 | 31.3 | 22.3 | 16.1 | 53.6 |
| Pressure bara | 11.4 | 10.6 | 3.1 | 10.3 | 1.0 | 1.6 | 1.0 | 11.5 |
| Comp Mole Frac ($CH_4$) | 50.0% | 71.5% | 15.5% | 99.3% | 44.6% | 24.8% | 2.6% | 36.4% |
| Comp Mole Frac ($CO_2$) | 50.0% | 28.5% | 84.5% | 0.7% | 55.4% | 75.2% | 97.4% | 63.6% |

In this process simulation, a product purity of 99.3% $CH_4$ in residue 26 from second membrane stage 110 is obtained, which would require 0.36 $m^2$ membrane area per $nm^3$/h of feed biogas and a specific power of 0.24 kW per $nm^3$/h of $CH_4$ in the product. This specific power refers only to the combined permeate recompression (stream 30) and does not include the power requirement of slurry pump 102 feeding liquid biomass feed 12 to anaerobic digester 104. This simulation achieves 99.3% $CH_4$ in product with 0.9% $CH_4$ loss in Stage 1 permeate vent gas and 54% recycle flow (Stage 3 residue+Stage 2 permeate) back to anaerobic digester 104.

Example 5: Purification of Relatively High Methane Content Biogas with High Selectivity Membranes Referring to FIG. 3, this example is similar in some aspects to Example 1 but is particularly suited to biogas 14 with a $CH_4$ content >70%. With appropriate processing inputs (biomass type, digestion conditions), high pressure digesters may yield biogas with higher $CH_4$ concentration than achievable in ambient pressure digesters. At sufficiently high $CH_4$ concentration, such as, >70%, in biogas 14, a two-stage membrane process configuration as shown in Example 1, may not be necessary and a single stage membrane configuration as shown in FIG. 3 may be more desirable in terms of separation cost efficiency.

In this simulation, the anaerobic digestion process operates at 11.4 bara by feeding biomass feedstock 12 to anaerobic digester 104 with slurry pump 102. The simulation uses a single membrane stage process utilizing hollow fiber modules with 165 micron outer diameter fibers having 80 GPU (gas permeance unit) $CO_2$ and 2 GPU $CH_4$. Pre-treated biogas feed 18 with 75% $CH_4$ content at 11.4 bara is fed to single membrane stage 108 with the permeate side at 1.0 bara. Residue 22 from single membrane stage 108 is produced at 98% $CH_4$ purity, suitable for a natural gas pipeline or CNG applications after optional polishing steps. Permeate 24, which is enriched in $CO_2$ and depleted in $CH_4$ compared to biogas feed 18, is recompressed to slightly above digester pressure for injection into the slurry space of anaerobic digester 104. A fraction of permeate 24 (vent stream 38) may be optionally diverted and used as a low grade fuel gas for heating utility needs in digester plants.

As shown in the process simulation results in Table 7 below, this example is well suited to give a high purity product of $CH_4$ starting with a relatively high $CH_4$ content in the biogas feed.

TABLE 7

| | Feed 18 (Stg1) | Res 22 (Stg1) | Perm 24 (Stg1) | Vent stream 38 | AD Recycle 32 |
|---|---|---|---|---|---|
| Molar Flow [$Nm^3$/h(gas)] | 100.0 | 65.0 | 35.0 | 10 | 25 |
| Pressure [bara] | 11.4 | 11.1 | 1.0 | 1.0 | 11.6 |
| Comp Mole Frac ($CH_4$) | 75.0% | 98.1% | 32.1% | 32.1% | 32.1% |
| Comp Mole Frac ($CO_2$) | 25.0% | 1.9% | 67.9% | 67.9% | 67.9% |

In this simulation, a product purity of 98.1% $CH_4$ in membrane residue 22 is obtained, which would require 2.1 $m^2$ membrane area per $nm^3$/h of feed biogas and a specific power of only 0.051 kW per $nm^3$/h of $CH_4$ in the product. This specific power refers only to permeate recompression 30 and does not include the power requirement of slurry pump 102 feeding liquid biomass feed 12 to anaerobic digester 104. This simulation achieves 98.1% $CH_4$ in product with up to 35% (relative to biogas feed 18) to permeate 24 available for recycle back to the anaerobic digester. In this example, permeate stream 24 is split into recycle stream 30 and vent stream 38. Stream 38 at 32% $CH_4$ is used for its fuel gas value, which is equivalent to 4.3% of the methane content in biogas feed 18. Streams 30 and 32 which are the actual permeate recycle to anaerobic digester 104 represent 25% of biogas gas 18 flow.

Reference herein to "one embodiment" or "some embodiments" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the indefinite article "a" or "an" means one or more.

As used herein, "about" or "around" or "approximately" in the text or in a claim means±10% of the value stated.

The term "ambient pressure" refers to an environment pressure approximately 1 atm or 1 bara.

The standard abbreviations of the elements from the periodic table of elements are used herein. It should be understood that elements may be referred to by these abbreviations (e.g., Si refers to silicon, N refers to nitrogen, O refers to oxygen, C refers to carbon, etc.).

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

Although the subject matter described herein may be described in the context of illustrative implementations to process one or more computing application features/operations for a computing application having user-interactive components the subject matter is not limited to these particular embodiments. Rather, the techniques described herein may be applied to any suitable type of user-interactive component execution management methods, systems, platforms, and/or apparatus.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

We claim:

1. A system for upgrading biogas through a membrane separation process comprising:

an anaerobic digester, operated under an operation pressure higher than atmosphere pressure, configured to generate the biogas from a feedstock containing an organic content;

a first membrane stage, configured to separate the biogas into a first residue stream, enriched in $CH_4$, withdrawn from the residue side of the first membrane stage and forwarded to a second membrane stage as a feed gas therein, and a first permeate stream, enriched in $CO_2$, withdrawn from the permeate side of the first membrane stage, and vented out;

the second membrane stage, connected to the first membrane stage in series, configured to separate the residue stream from the first membrane into a second residue stream, enriched in $CH_4$, withdrawn from the residue side of the second membrane stage and forwarded to a point of use, and a second permeate stream, enriched in $CO_2$, withdrawn from the permeate side of the second membrane stage and sent to a compressor; and a third membrane stage, configured to separate the first permeate stream from the first membrane stage into a third residue stream containing $CO_2$ and $CH_4$, withdrawn from the residue side of the third membrane stage and sent to the compressor, and a third permeate stream, enriched in $CO_2$, withdrawn from the permeate side of the third membrane stage, and vented out, wherein the residue stream from the third membrane stage in combination with the permeate stream from the second membrane stage is compressed and recycled back to the bottom volume of the digestate sludge phase in the anaerobic digester;

wherein the compressor is configured to compress the second permeate stream from the second membrane stage and the third residue stream form the third membrane stage to a pressure greater than the operation pressure.

2. The system of claim 1, wherein the operation pressure is higher than 4 bara.

3. The system of claim 1, wherein the first membrane stage, second membrane stage and third membrane stage, each contains a plurality of gas separation membranes made of one or more of fluoropolymers, copolymers of polyether-polyamide, polyimides, and polymers of intrinsic morphology (PIMs) having a $CO_2$/methane selectivity of at least 10 and a $CO_2$ permeance of at least 50 GPU.

4. The system of claim 1, wherein the first membrane stage, second membrane stage and third membrane stage, each contains a plurality of gas separation membranes, each of the plurality of gas separation membranes is a composite hollow fiber membrane comprising a separation layer disposed on a substrate layer, the separation layer being made of one or more of fluoropolymers, copolymers of polyether-polyamide, polyimides, and polymers of intrinsic morphology (PIMs), the substrate layer being made of one or more of polysulfone, polyvinyledene fluoride, a polyimide, polyether ketone, and polyether ether ketone.

5. The system of claim 1, further comprising a recycle gas injector, configured to inject the compressed stream into the digestate sludge phase in the anaerobic digester, wherein a driving force is provided and controlled to achieve a pressure difference between an exterior and interior of the recycle gas injector.

6. The system of claim 1, wherein a pressure of the compressed combination stream and a pressure of the compressed second permeate stream are greater than the operation pressure of the anaerobic digester.

7. The system of claim 1, wherein a pH adjusting chemical is added to the anaerobic digester, wherein the pH adjusting chemical is a strong base selected from magnesium hydroxide, sodium hydroxide, quicklime, lime, calcium hydroxide or a sodium salt of carbonic acid selected from sodium bicarbonate or sodium carbonate.

8. The system of claim 1, wherein pressure differences across the first membrane stage, across the second membrane stage and across the third membrane stage serve as a driving force to separate the biogas, the first residue stream and the first permeate stream, respectively.

9. The system of claim 1, wherein the anaerobic digester is a pressurized anaerobic digestion reactor suitable for operation under a pressure greater than atmosphere pressure.

10. A membrane separation process for upgrading biogas from an anaerobic digester, the process comprising the steps of:

feeding a feedstock having an organic content to the anaerobic digester;

generating the biogas comprising $CH_4$ and $CO_2$ from the anaerobic digester under an operation pressure greater than atmosphere pressure;

feeding the biogas to a first membrane stage, wherein the biogas is separated into a first residue stream enriched in $CH_4$ and a first permeate stream enriched in $CO_2$ compared to the biogas;

feeding the first residue stream from the first membrane stage to a second membrane stage, wherein the first residue stream is separated into a second residue stream enriched in $CH_4$ and a second permeate stream enriched in $CO_2$ compared to the first residue stream;

feeding the first permeate stream to a third membrane stage, wherein the first permeate stream is separated into a third residue stream containing $CO_2$ and $CH_4$ and a third permeate gas enriched in $CO_2$;

compressing a combination stream of the third residue stream from the third membrane stage and the second permeate stream from the second membrane stage; and recycling the compressed combination stream back to the bottom volume of digestate sludge phase in the anaerobic reactor.

11. The membrane separation process of claim 10, wherein the operation pressure is greater than 4 bara.

12. The membrane separation process of claim 10, wherein the second residue stream from the second membrane stage has a purity greater than 98% $CH_4$.

13. The membrane separation process of claim 10, wherein a pressure of the compressed combination stream is greater than the operation pressure of the anaerobic digester.

14. The membrane separation process of claim 10, further comprising adding a pH adjusting chemical to the feedstock, wherein the pH adjusting chemical is a strong base selected from magnesium hydroxide, sodium hydroxide, quicklime, lime, calcium hydroxide or a sodium salt of carbonic acid selected from sodium bicarbonate or sodium carbonate.

15. The membrane separation process of claim 10, wherein pressure differences across the first membrane stage, across the second membrane stage and across the third membrane stage serve as a driving force to separate the biogas, the first residue stream and the first permeate stream.

* * * * *